United States Patent [19]
Rabow

[11] 3,815,028

[45] June 4, 1974

[54] MAXIMUM-LIKELIHOOD DETECTION SYSTEM

[75] Inventor: Gerald Rabow, Nutley, N.J.

[73] Assignee: International Telephone and Telegraph Corporation, Nutley, N.J.

[22] Filed: Aug. 9, 1972

[21] Appl. No.: 279,119

[52] U.S. Cl. .................................. 325/304, 178/88

[51] Int. Cl. .......................................... H04b 1/12

[58] Field of Search ......... 325/42, 56, 65, 474, 475, 325/476, 301, 302, 303, 304, 305, 306, 30, 41, 44, 45, 52, 56, 65, 320–323, 344; 328/104, 152, 154; 178/67, 88

[56] References Cited

UNITED STATES PATENTS

| | | | |
|---|---|---|---|
| 3,226,644 | 12/1965 | Goode et al. | 325/56 |
| 3,296,532 | 1/1967 | Robinson | 325/304 X |
| 3,365,666 | 1/1968 | Reynders et al. | 325/304 |
| 3,614,623 | 10/1971 | McAuliffe | 325/65 X |
| 3,617,889 | 11/1971 | Rabinowitz | 325/56 X |
| 3,633,107 | 1/1972 | Brady | 325/42 X |

*Primary Examiner*—Robert L. Griffin
*Assistant Examiner*—A. M. Psitos
*Attorney, Agent, or Firm*—John T. O'Halloran; Menotti J. Lombardi, Jr.; Alfred C. Hill

[57] ABSTRACT

There is disclosed a system for simultaneously providing optimum equalization and optimum diversity combining for a digital signal transmitted through a dispersive medium by means of maintaining, updating and minimizing a set of noise residues. Each of $m^{(L-1)}$ storage means store a different one of $m^{(L-1)}$ digital message sequences capable of being received from the medium, where $m$ is an integer greater than one equal to the number of symbols transmitted and L is an integer greater than one equal to the number of bit intervals over which there will be significant receiver response due to a transmitted one of the m symbols. n receivers are provided for the digital signal, where $n$ is an integer including one equal to the number of signal paths for the digital signal that has traveled through the dispersive medium which are referred to as "folds of diversity". A generator is coupled to the n receivers to generate from the received digital signal $nm^L$ noise residues. Each of $m^{(L-1)}$ minimum noise selectors are coupled to the generator to detect in a different one of $m^{(L-1)}$ groups of m noise residues that noise residue having a first minimum value. $m^{(L-1)}$ storage devices are each coupled to a different one of $m^{(L-1)}$ minimum noise selectors to store the associated one of that noise resude having the first minimum value. A minimum noise residue selector is coupled to the $m^{(L-1)}$ storage device to detect from the stored noise residues that noise residue having a second minimum value. A switching arrangement coupled to all the $m^{(L-1)}$ storage means responds to the noise residue having the second minimum value to provide one of the $m^{(L-1)}$ digital message sequences as an output digital message sequence for the detection system. $m^{(L-1)}$ switching arrangements are each coupled to a different one of the $m^{(L-1)}$ storage means, m predetermined ones of the $m^{(L-1)}$ storage means and a different one of the $m^{(L-1)}$ minimum storage selectors to update the message sequence stored in the associated one of the storage means by a predetermined number of bits of the message sequence in that one of the predetermined ones of the m storage means corresponding to the noise residue having the first minimum value in the associated one of the $m^{(L-1)}$ groups of m noise residues.

8 Claims, 8 Drawing Figures

MAXIMUM-LIKELIHOOD DETECTION SYSTEM

BACKGROUND OF THE INVENTION

This invention relates to a detection system for a digital signal propagated through a dispersive medium and more particularly to an optimum digital tropospheric scatter detection system.

The present invention proposes an optimum digital tropospheric scatter detection system where the pulse response of the tropospheric scatter medium can be obtained or is known. This optimum system is referred to herein as a maximum-likelihood detection system and will be fully described hereinbelow.

One alternative scheme known in the prior art is termed "linear equalization." An "optimum" linear equalization scheme is presented in an article by M. J. DiToro entitled "Communication in Time-Frequency Spread Media Using Adaptive Equalization" located in the Proceedings of the IEEE, Vol. 56, No. 10, October 1968, pages 1,653–1,679. The DiToro system has several drawbacks when compared with the maximum-likelihood scheme described hereinbelow. The performance of the DiToro system can be readily seen to be poorer, and errors are made even for a noise-to-signal ratio equal to zero. A complicated synthesis procedure is required to relate equalization tap gain settings to medium impulses response, and it is not immediately obvious how diversity combining is to be incorporated into the synthesis procedure. The DiToro procedure is based on band-limited signals, which are not necessarily optimum or desirable, and it is not immediately obvious how the system should be modified or approximated for non-band-limited signals. The DiToro method further requires signals with randomness statistics, and if this cannot be guaranteed, message scramblers must be incorporated. Finally, the four racks of equipment pictured in the article suggests that the DiToro scheme requires much more hardware than the maximum-likelihood scheme of the present invention.

The problem of decoding a time dispersed signal has some similarities to decoding signals which have been encoded sequentially for the purpose of error reduction. A scheme of sequential decoding has been proposed in an article by R. Fano entitled "A Heuristic Discussion of Probabilistic Decoding" located in the IEEE Transactions On Information Theory, Vol. IT-9, No. 2, April 1963. The Fano scheme does not appear to be as suitable for decoding high speed digital tropospheric signals as the maximum-likelihood scheme proposed herein, for the following reasons. The comparatively large number of elementary operations that must be performed per information bit makes serial processing as opposed to parallel processing unsuitable for high data rates. The Fano method is efficient on the average, but is much less efficient at the 0.01 percent point or so which is usually of prime interest in communication, where the Fano method would require a lot of retracing. Finally, the Fano method in theory requires going back over sequences approaching the entire message length, whereas in the maximum-likelihood detection system proposed herein the basic processing ranges only over L digits or bits.

SUMMARY OF THE INVENTION

An object of the present invention is to provide an optimum maximum-likelihood detection system for digital signals propagated through a dispersive medium incorporating either a single digital signal receiver or a plurality of digital signal receivers arranged in any known diversity configuration.

Another object of the present invention is the provision of a maximum-likelihood detection system which incorporates less hardware than the prior art DiToro arrangement discussed hereinabove.

Still another object of the present invention is to provide a maximum-likelihood detection system wherein it is necessary to process only a few number of bits of an entire digital message rather than processing that number of bits approaching the entire message length as is required in the Fano arrangement discussed hereinabove.

A feature of the present invention is the provision of a maximum-likelihood diversity detection system for a digital signal propagated through a dispersive medium comprising: $m^{(L-1)}$ first means, each of the first means storing a different one of $m^{(L-1)}$ digital message sequences capable of being received from the medium, where $m$ is an integer greater than one equal to the number of symbols transmitted and $L$ is an integer greater than one equal to the number of bit intervals over which there will be significant receiver response due to a single transmitted one of the $m$ symbols; $n$ receivers for the digital signal, where $n$ is an integer greater than one equal to the number of signal paths for the digital signal that has traveled through the dispersive medium which are referred to as "folds of diversity"; second means coupled to the $n$ receivers to generate from the digital signal $nm^L$ noise residues; $m^{(L-1)}$ third means coupled to the second means, each of the third means detecting in a different one of $m^{(L-1)}$ groups of $m$ noise residues that noise residue having a first minimum value; $m^{(L-1)}$ fourth means each coupled to a different one of the $m^{(L-1)}$ third means to store the associated one of the noise residue having the first minimum value; and fifth means coupled to the $m^{(L-1)}$ first means and the $m^{(L-1)}$ fourth means to detect from the stored noise residues that noise residue having a second minimum value and to provide one of the $m^{(L-1)}$ digital message sequences as an output digital message sequence for the detection system, the output message sequence being determined by the noise residue having the second minimum value.

Another feature of the present invention is the provision of a maximum-likelihood detection system for a digital signal propagated during dispersive medium as set forth hereinabove and further including $m^{(L-1)}$ sixth means each coupled to a different one of the $m^{(L-1)}$ first means, $m$ predetermined ones of the $m^{(L-1)}$ first means and a different one of the $m^{(L-1)}$ third means to update the message sequence stored in the associated one of the $m^{(L-1)}$ first means by a predetermined number of bits of the message sequence in that one of the predetermined ones of $m$ first means corresponding to the noise residue having the first minimum value in the associated one of the $m^{(L-1)}$ groups of $m$ noise residues.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
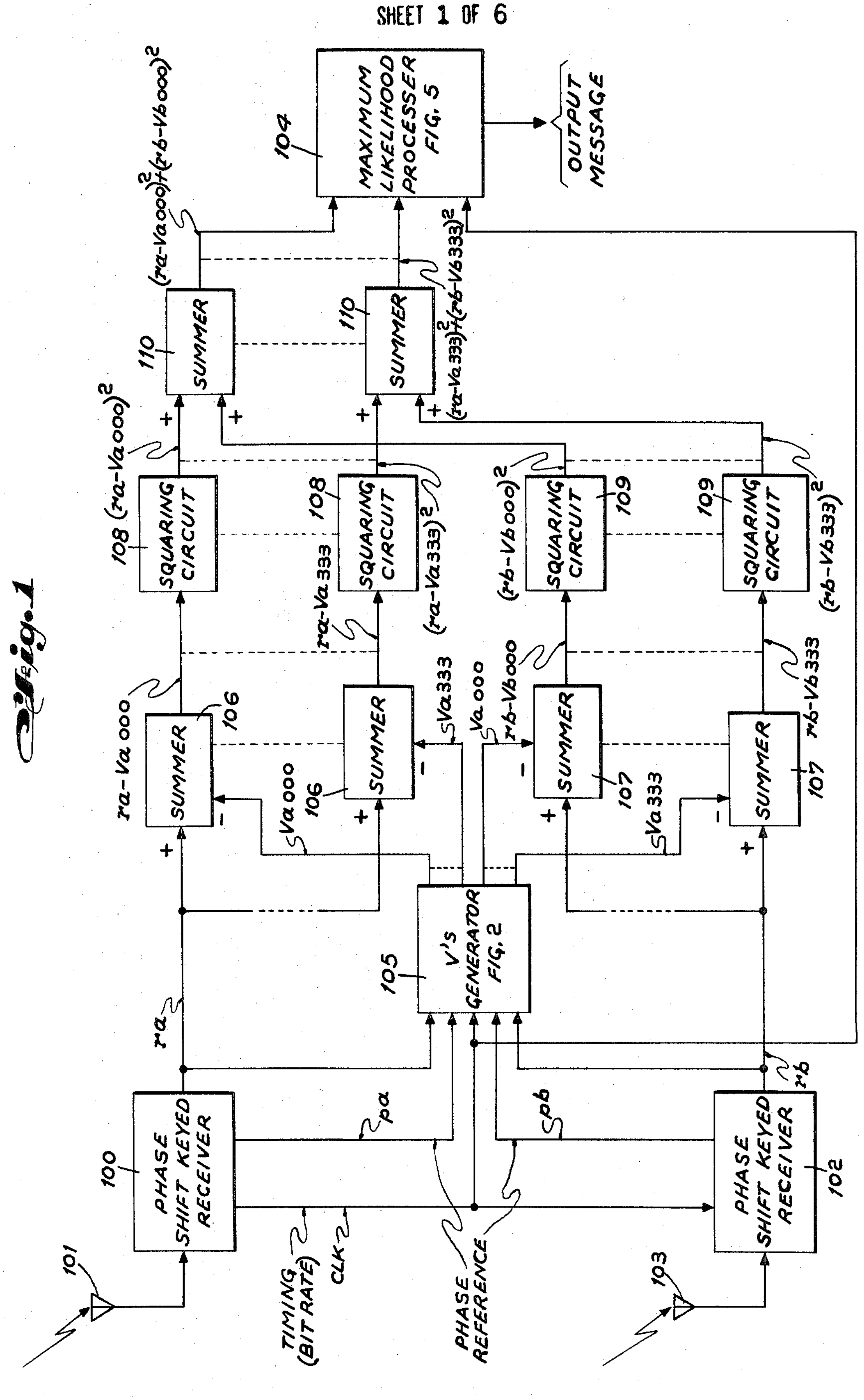
FIG. 1 is a block diagram of an overall maximum-likelihood detection system in accordance with the principles of the present invention.

A maximum-likelihood detection system is obtained by calculating the signal which would be received, on each receiver if diversity is employed, for each possible message sequence. This can be done since the medium response is assumed to be known. If there were no receiver noise, the signal actually received would correspond to that calculated for the correct message and to no other, and the correct message could thus be determined. Note that for such a noiseless maximum-likelihood detection system, errorless performance can be obtained regardless of the amount of dispersion. Such a statement cannot be made for conventional tropospheric scatter systems. Such conventional systems are limited to rates which are small compared to the reciprocal of the dispersion even in the absence of noise, and would suffer intolerable error rates if the transmission rate were raised to violate this criterion.

In the presence of receiver noise, the maximum-likelihood scheme is implemented by determining the residual noise, that is, that noise which must be assumed added to the calculated message to obtain the actual received message. That message is then assumed to have been transmitted for which the residual noise is likeliest. If the noise is Gaussian, then the noise which is likeliest is also the one whose mean square value is minimum. If there are several independent noise sources of similar characteristics, such as in several receivers used for diversity purposes, then the noise to be minimized is the mean square sum of all the individual noise sources or receivers. Thus, the question of how to combine diversely received signal is automatically resolved in maximum-likelihood detection. A further advantage of maximum-likelihood detection is that filtering with circuit elements is not essential, and, hence, the problem of optimum filter design is avoided. Filters may be used as a practical convenience, but their characteristics are no longer critical.

The question of processing complexity must now be considered. Let the number of transmitted symbols be $m$, and let the number of intervals (bit intervals) over which there will be a significant receiver response due to a single transmitted symbol be L. In a tropospheric scatter system, L is greater than one due to dispersion. Typical values for $m$ and L that are employed herein for purposes of explanation and, of course, not limited thereto are $m = 4$, such as is present in a quaternary phase shift keyed (PSK) modulation system, and $L = 3$, which allows three times the transmission speed for a conventional tropospheric scatter system where most of the time dispersion must be contained within a single interval. It will now be shown that maximum-likelihood detection can be realized, without approximation, by storing $m^{(L-1)}$ messages ($m^{(L-1)} = 16$ for $m = 4$, $L = 3$), with $m^{(L-1)}$ decisions of the smallest one of $m$ noise residues at each baud or bit interval. The processing can be reduced below this if an approximate implementation is desired by reducing the number of M of messages to be stored. However, it has been calculated that this approximate implementation as compared with an implementation without approximation increase the error rate vs the signal to noise ratio. In this approximate implementation, only those M messages of the $m^{(L-1)}$ possible with lowest noise residue are stored.

Consider sequences $A_1S_1S_2$ - - - $S_{(L-1)}$ and $A_2S_1S_2$ - - - $S_{(L-1)}$, where $S_1$ - - - $S_{(L-1)}$ are the last (L−1) symbols of the sequence, which is the same for both sequences, and $A_1$ and $A_2$ are prior sequences of symbols. Let the noise residue for sequence $A_1$ $S_2$ - - - $S_{(L-1)}$ be less than that for $A_2$ $S_1$ - - - $S_{(L-1)}$. The noise residue for $A_1$ $S_1$ - - - $S_{(L-1)}$ $A_3$ is less than that for $A_2$ $S_1$ - - - $S_{(L-1)}$ $A_3$, where $A_3$ is any sequence, since the contributions following $S_{(L-1)}$ are identical for both sequences, because the only symbols in which the sequences differ are too far removed to overlap $A_3$. Therefore, from calculations it can be shown that of all sequences ending $S_1$ $S_2$ - - - $S_{(L-1)}$ only that sequence with minimum noise residue is a candidate for the likeliest transmitted sequence. The same statement can be made for a sequence ending in any other combination of ($L$−1) symbols. Since there are $m^{(L-1)}$ such combinations, the $m^{(L-1)}$ sequences, each of which is the likeliest ending in a particular ($L$−1) symbols, are sure to include the likeliest transmitted sequence.

Assume now these $m^{(L-1)}$ sequences have been determined, and it is now desired to update the sequences by one symbol, that is, $m^{(L-1)}$ updated sequences are required. Let us now concentrate our attention on one of these sequences, namely, that sequence ending in $S_2$ $S_3$ - - - $S_{(L-1)}$ $S_L$. There are $m$ of the un-updated sequences which are candidates for this updated sequence, namely, the $m$ sequences whose last (L−2) terms are $S_2$ $S_3$ - - - $S_{(L-1)}$. The desired sequence is, hence, the one of the $m$ candidate sequences with the lowest noise residue. The mean square noise residue of each candidate is obtained as the sum of the previous noise residue of the candidate and an increment involving the symbol having the initial interval corresponding to $S_L$. The calculated signal for the initial interval is $V = S_Lh_i + S_{(L-1)}h_2 + \cdots S_2h_{(L-1)} + S_1h_L$, where $h_1$, $h_2$ - - - are the medium pulse responses in the first, second, etc. bit intervals, and the noise residue is $(r\text{-}V)^2$, plus contributions from other diversity receivers where $r$ is the actual received signal. It should be noted that $V$ is invariant with time as long as $h_i$ remains constant for any particular sequence of length $L$, and this is utilized in the implementation of the maximum-likelihood technique of the present invention.

Finally, the proper message out of the $m^{(L-1)}$ stored sequences must be chosen. This is accomplished by choosing the one of the $m^{(L-1)}$ sequences having the lowest noise residue. In practice, storage will be finite and will eventually overflow. The message symbol is then chosen as the one of the $m^{(L-1)}$ overflowing symbols corresponding to the sequence with the lowest noise residue.

Referring to FIG. 1, there is disclosed therein a block diagram of an overall maximum-likelihood diversity detection system in accordance with the principles of the present invention. For purposes of illustration the detection system of FIG. 1 and the following diagrams of FIGS. 2 to 8 will be concerned with a maximum-likelihood diversity detection system with all $m^{(L-1)}$ sequences stored where $m = 4$, $L=3$ and $n=2$ or a two fold diversity system, that is, a diversity system responding to a signal following two different signal paths through a dispersive medium and having two different signal channels one for each signal on the two different signal paths. The detection of system FIG. 1 in accordance with the principles of the present invention includes a PSK receiver 100 for receiving from antenna 101 a message sequence after having been propagated through a dispersive medium. There is also provided a PSK receiver 102 to receive the same message sequence after being propagated through the dispersive medium which is received on antenna 103. The signals received on antennas 101 and 103 differ because the propagation path to the two antennas is slightly different. Receivers 100 and 102 can be any form of known PSK receiver to provide a down converted representation of the received message signal identified in the drawing as ra and rb at the output of receivers 100 and 102, respectively. The receivers 100 and 102 also provide a phase reference identified as pa and pb, respectively. This reference phase is a carrier reference phase for the receivers and may be provided by a pilot tone on a separate low energy channel or it may be provided by locally generated carrier oscillations used in demodulating the PSK signal at intermediate frequencies (IF) by employing synchronous detectors. Another signal provided by receiver 100 is a timing signal having the bit rate identified as CLK. This timing signal may be provided on a separate low energy channel or may be derived from the PSK digital data stream in any well known manner to produce the bit rate clock or timing signal CLK. The CLK signal of receiver 100 is used as a reference signal in conjunction with a signal CLK present in receiver 102 which through means of a phase control arrangement, such as a phase locked loop, locks the CLK signal of the two receivers 100 and 102 in a desired phase relationship.

For processing a maximum-likelihood processor 104 is provided having as inputs the mean square residue noise signals contributed by both receivers 100 and 102 as illustrated. These mean square noise residue signals are produced by the V's generator 105 which receives as inputs thereto signals *ra*, *rb*, *pa*, *pb* and CLK from receivers 100 and 102. The number of resultant V's produced by generator 105 are equal to $m^L$ for each of the folds of diversity, that is, for each of the different signal paths followed by the signal that has traveled through a dispersive medium, or in other words $nm^L$ *V*'s. The V's produced by generator 105 from outputs of receiver 100 are coupled to summers 106 which receives as its other input the output of receiver 100, namely, ra. Summers 106 take the algebraic sum of *ra* and the *V* signal coupled to the associated summer, which as illustrated at the output of summers 106 actually produces a difference. The $m^L$ *V* signals for the second fold of diversity (contributions from receiver 102) are coupled as one input to summers 107 each of which receive as their other input the output of receiver 102, namely, rb. Here again summers 107 like summers 106 provide an algebraic addition as represented by the polarity sign on the inputs resulting in a subtraction as indicated at the output of summer 107. The output from each of the summers 106 are coupled to a squaring circuit 108 to provide the mean square noise residue for the output of the associated summer 106. Similarly the output of summers 107 are coupled to individual ones of square circuits 109 to provide the mean square noise residue signal for receiver 102. The signals from corresponding ones of squaring circuits 108 and 109 are coupled to summers 110 to provide the means squaring residue noise taking into consideration the means square residue noise contributed by both folds of diversity.

Figure 2:
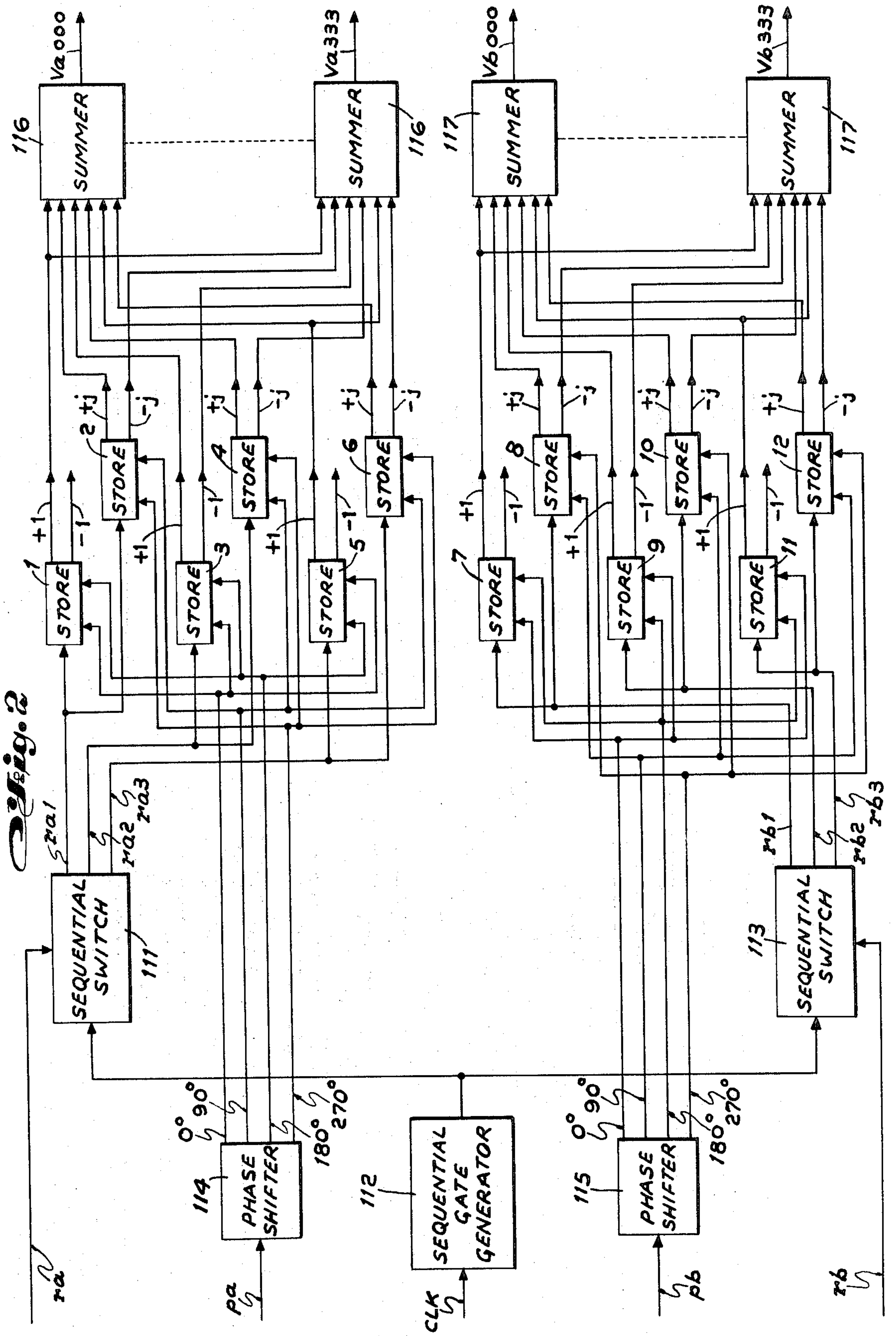
FIG. 2 is a block diagram illustrating one embodiment of the V's generator of FIG. 1.
Figures 3, 4, 6:
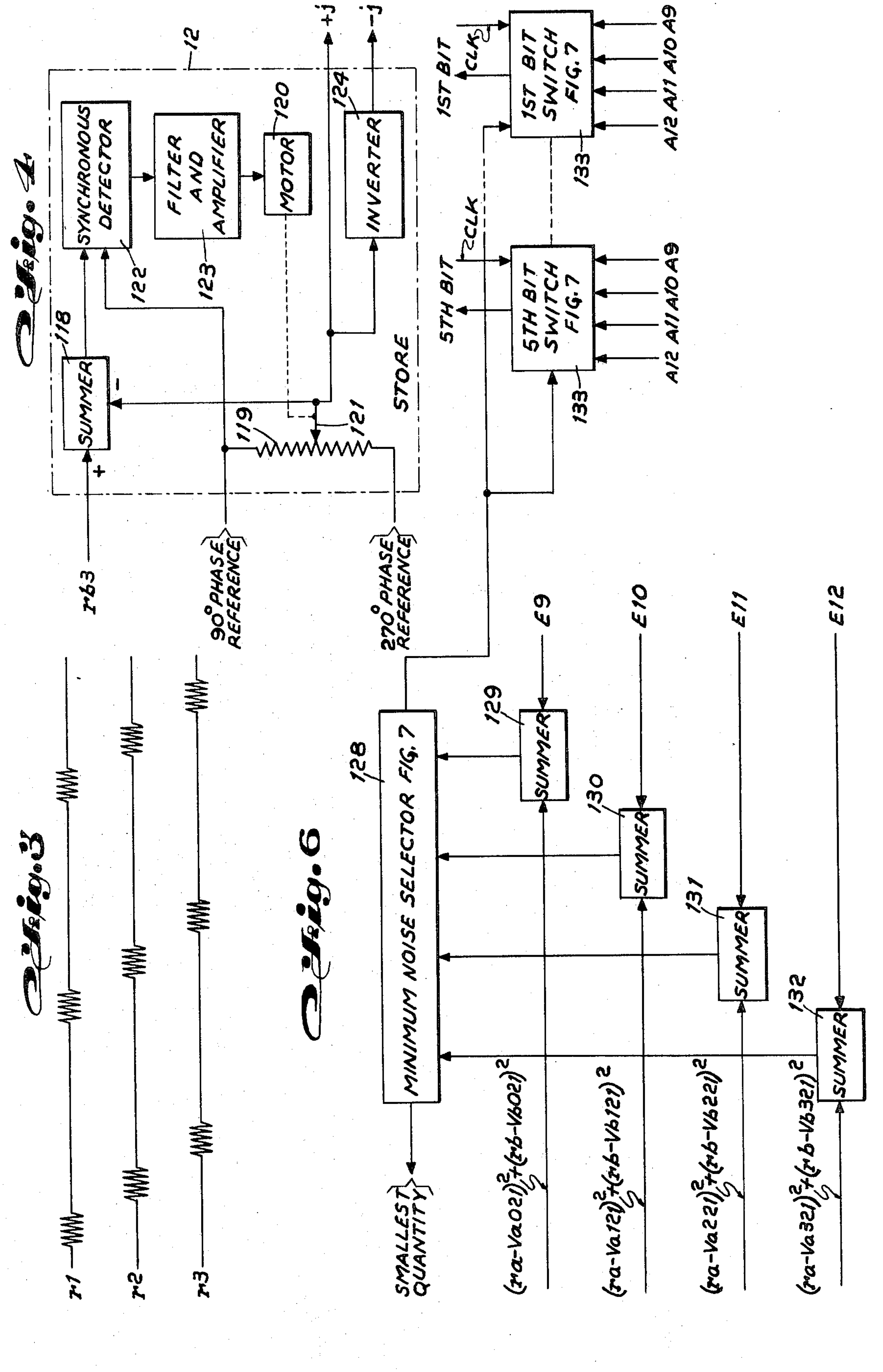
FIG. 3 is a set of curves illustrating the outputs of the sequential switches of FIG. 2.
FIG. 4 is a block diagram of one of the stores, namely, store 12 of FIG. 2.
FIG. 6 is a block diagram of one of the $m^{(L-1)}$ up daters of FIG. 5.

Generator 105 is illustrated in block diagram form in FIG. 2. The *ra* output from receiver 110 is coupled to sequential switch 111 to produce three time sequential outputs for signal *ra* under control of a sequential gate generator 112 which in turn is controlled by the signal CLK. This gate generator is activated whenever a medium testing pulse is transmitted. Since the medium changes slowly relative to the communication rate, the number of pulses transmitted in order to test the medium and update the *V*s is relatively small. Generator 112 may include a gate generator under control of the signal CLK to produce a gate signal equal to a bit interval. This gate signal is then passed through a tapped delay line with the taps on this delay line providing the desired delay between signals $r_1$, $r_2$ and $r_3$ as illustrated in FIG. 3. The signal $r_1$, $r_2$ and $r_3$ are then combined and applied in time sequence to switches 111 and 113 over a single conductor. The outputs from the taps of the delay line may then be coupled to a coincident gate in switch 111 which will pass signal *ra* during the interval of the gate pulse received from the associated tap of the delay line. In a similar manner signal *rb* is coupled to sequential switch 113 which has the same function as sequential switch 111 and is under control of gate generator 112 and may have the implementation as described hereinabove with respect to switch 111.

The phase reference pa is coupled to phase shifter 114 and produces at its output four signals separated from each other by 90°, namely, 0°, 90°, 180°, 270° of the phase reference *pa*. Similarly the phase reference *pb* is coupled to phase shifter 115 to produce similar phase reference signals for phase reference *pb*.

The output signal *ra*1 from switch 111 is coupled to stores 1 and 2, the output signal *ra*2 is coupled to stores 3 and 4 while the output signal ra3 is coupled to stores 5 and 6. These stores receive an appropriate phase reference from phase shifter 114 as indicated so that stores 1, 3 and 5 will provide inphase outputs for each of the signals ra1, ra2 and ra3 while store 2, 4 and 6 produce quadrature outputs for each of the signals *ra*1, *ra*2 and *ra*3. The quadrature relationship between the pairs of stores 1, 2; 3, 4 and 5, 6 is provided by the quadrature relationship provided by the phase reference signals applied to these stores. Similarly, stores 7–12 receive their inputs from switch 113, namely, stores 7 and 8 receive the signal rb1, stores 9 and 10 receive the signal *rb*2 and stores 11 and 12 receive the signal *rb*3. Each of the pair of stores 7, 8; 9, 10 and 11, 12 receive inphase and quadrature reference signals from phase shifter 115 to produce the inphase and quadrature outputs illustrated.

As previously mentioned, $m = 4$ which can be implementated by a quaternary PSK modulation system and, thus, there are four digital symbols that can be transmitted. TABLE I hereinbelow illustrates the relationship between the quaternary symbols, the outputs from stores 1–6 or 7–12 and the phase of the quaternary PSK modulation system.

TABLE I

| Quaternary Symbols | Store Outputs | Phase |
|---|---|---|
| 0 | $+ + j$ | 0° |
| 1 | $- + j$ | 90° |
| 2 | $- 1 - j$ | 180° |
| 3 | $+ 1 - j$ | 270° |

Appropriate ones of the outputs from stores 1–6 are coupled to summers 116. In the example employed herein the number of summers 116 are equal to $m^L = 64$ each of which produce a particular *V* output signal as derived from appropriate ones of the outputs from stores 1–6. These *V* signals are identified by Vaxxx with the *x*'s indicating three different quaternary symbols. The a indicates that the *V* signal is produced from the ra output of receiver 100. The *x*'s each represent a 1 and *j* input to the associated one of summers 116. The 1 and *j* represented by the first quaternary bit will have the polarity determined by the quaternary symbol in this position as indicated in TABLE I and will always be derived from stores 5 and 6. The 1 and *j* represented by the second quaternary bit will have the polarity determined by the quaternary symbol in this position as indicated in TABLE I and will always be derived from stores 3 and 4. The 1 and *j* represented by the third quaternary bit will have the polarity determined by the quaternary symbol in his position as indicated in TABLE I and will always be derived from stores 1 and 2.

Summers 117 likewise are 64 in number and are appropriately coupled to the proper ones of stores 7–12 to produce the *V* signals for the *rb* signal at the output of receiver 102. The *V* signals are identified as Vbxxx. The symbol *b* indicates that the *V* signal is derived from *rb* (receiver 102). The three quaternary bits each represent a proper 1 and *j* polarity as indicated in TABLE I with the proper polarity 1 and *j* of the first quaternary bit always being deriving from stores 11 and 12, with the proper polarity 1 and *j* of the second quaternary bit always being derived from stores 9 and 10 and with the proper polarity 1 and *j* of the third quaternary bit always being derived from stores 7 and 8.

TABLE II hereinbelow illustrates the outputs of summers 116 or summers 117 and the input to the summers as derived from the various ones of the stores. This will enable one ordinarily skilled in the art to provide the proper connection of the 62 summers 116 or 117 to stores 1–6 or 7–12, that are illustrated, to provide the corresponding V signal output.

TABLE II

| Summer Output Vi=Va or Vb | Input to summer from— Store 6 or 12 | Store 5 or 11 | Store 4 or 10 | Store 3 or 9 | Store 2 or 8 | Store 1 or 7 |
|---|---|---|---|---|---|---|
| Vi000 | +j | +1 | +j | +1 | +j | +1 |
| Vi001 | +j | +1 | +j | +1 | +j | −1 |
| Vi002 | +j | +1 | +j | +1 | −j | −1 |
| Vi003 | +j | +1 | +j | +1 | −j | +1 |
| Vi010 | +j | +1 | +j | −1 | +j | +1 |
| Vi011 | +j | +1 | +j | −1 | +j | −1 |
| Vi012 | +j | +1 | +j | −1 | −j | −1 |
| Vi013 | +j | +1 | +j | −1 | −j | +1 |
| Vi020 | +j | +1 | −j | −1 | +j | +1 |
| Vi021 | +j | +1 | −j | −1 | +j | −1 |
| Vi022 | +j | +1 | −j | −1 | −j | −1 |
| Vi023 | +j | +1 | −j | −1 | −j | +1 |
| Vi030 | +j | +1 | −j | +1 | +j | +1 |
| Vi031 | +j | +1 | −j | +1 | +j | −1 |
| Vi032 | +j | +1 | −j | +1 | −j | −1 |
| Vi033 | +j | +1 | −j | +1 | −j | +1 |
| Vi100 | +j | −1 | +j | +1 | +j | +1 |
| Vi101 | +j | −1 | +j | +1 | +j | −1 |
| Vi102 | +j | −1 | +j | +1 | −j | −1 |
| Vi103 | +j | −1 | +j | +1 | −j | +1 |
| Vi110 | +j | −1 | +j | −1 | +j | +1 |
| Vi111 | +j | −1 | +j | −1 | +j | −1 |
| Vi112 | +j | −1 | +j | −1 | −j | −1 |
| Vi113 | +j | −1 | +j | −1 | −j | +1 |
| Vi120 | +j | −1 | −j | −1 | +j | +1 |
| Vi121 | +j | −1 | −j | −1 | +j | −1 |
| Vi122 | +j | −1 | −j | −1 | −j | −1 |
| Vi123 | +j | −1 | −j | −1 | −j | +1 |
| Vi130 | +j | −1 | −j | +1 | +j | +1 |
| Vi131 | +j | −1 | −j | +1 | +j | −1 |
| Vi132 | +j | −1 | −j | +1 | −j | −1 |
| Vi133 | +j | −1 | −j | +1 | −j | +1 |
| Vi200 | −j | −1 | +j | +1 | +j | +1 |
| Vi201 | −j | −1 | +j | +1 | +j | −1 |
| Vi202 | −j | −1 | +j | +1 | −j | −1 |
| Vi203 | −j | −1 | +j | +1 | −j | +1 |
| Vi210 | −j | −1 | +j | −1 | +j | +1 |
| Vi211 | −j | −1 | +j | −1 | +j | −1 |
| Vi212 | −j | −1 | +j | −1 | −j | −1 |
| Vi213 | −j | −1 | +j | −1 | −j | +1 |
| Vi220 | −j | −1 | −j | −1 | +j | +1 |
| Vi221 | −j | −1 | −j | −1 | +j | −1 |
| Vi222 | −j | −1 | −j | −1 | −j | −1 |
| Vi223 | −j | −1 | −j | −1 | −j | +1 |
| Vi230 | −j | −1 | −j | +1 | +j | +1 |
| Vi231 | −j | −1 | −j | +1 | +j | −1 |
| Vi232 | −j | −1 | −j | +1 | −j | −1 |
| Vi233 | −j | −1 | −j | +1 | −j | +1 |
| Vi300 | −j | +1 | +j | +1 | +j | +1 |
| Vi301 | −j | +1 | +j | +1 | +j | −1 |
| Vi302 | −j | +1 | +j | +1 | −j | −1 |
| Vi303 | −j | +1 | +j | +1 | −j | +1 |
| Vi310 | −j | +1 | +j | −1 | +j | +1 |
| Vi311 | −j | +1 | +j | −1 | +j | −1 |
| Vi312 | −j | +1 | +j | −1 | −j | −1 |
| Vi313 | −j | +1 | +j | −1 | −j | +1 |
| Vi320 | −j | +1 | −j | −1 | +j | +1 |
| Vi321 | −j | +1 | −j | −1 | +j | −1 |
| Vi322 | −j | +1 | −j | −1 | −j | −1 |
| Vi323 | −j | +1 | −j | −1 | −j | +1 |
| Vi330 | −j | +1 | −j | −1 | +j | +1 |
| Vi331 | −j | +1 | −j | −1 | +j | −1 |
| Vi332 | −j | +1 | −j | −1 | −j | −1 |
| Vi333 | −j | +1 | −j | −1 | −j | +1 |

FIG. 4 illustrates one embodiment of an implementation of the stores 1–12 and in particular store 12. The only difference between store 12 and the other stores is the particular input to summer 118 and the particular phase reference applied to the servo controlled potentiometer 119, said potentiometer 119 being controlled by motor 120. Summer 118 provides subtraction as indicated by the polarity signs on the inputs. One input of summer 118 is *rb*3 while the other input is derived from the moving contact 121 of servo potentiometer 119. The 90° phase reference from phase shifter 115 (FIG. 2) is coupled as one input to synchronous detector 122 which receives as its other input the output of summer 118. Any phase error detected in detector 122 is passed through filter and amplifier 123 to act as a control signal for motor 120 to adjust potentiometer 119 to reduce the error signal from detector 122 to zero. Since store 12 provides a quadrature output the *+j* output is taken from the moving contact 121 and the *−j* output is provided through means of inverter 124.

It should be noted in FIGS. 1 and 2 that there is a duplication of equipment and function for each of the folds of diversity, and as will be pointed out hereinbelow with reference to FIG. 5, processor 104 contains the same equipment regardless of the number of folds of diversity. Thus, the maximum-likelihood detection system of the present invention is not required to be employed in a diversity receiver, but may be employed where there is only one receiver ($n$=1) to provide an optimum detection of a digital message sequence propagated through a dispersive medium.

Figure 5:
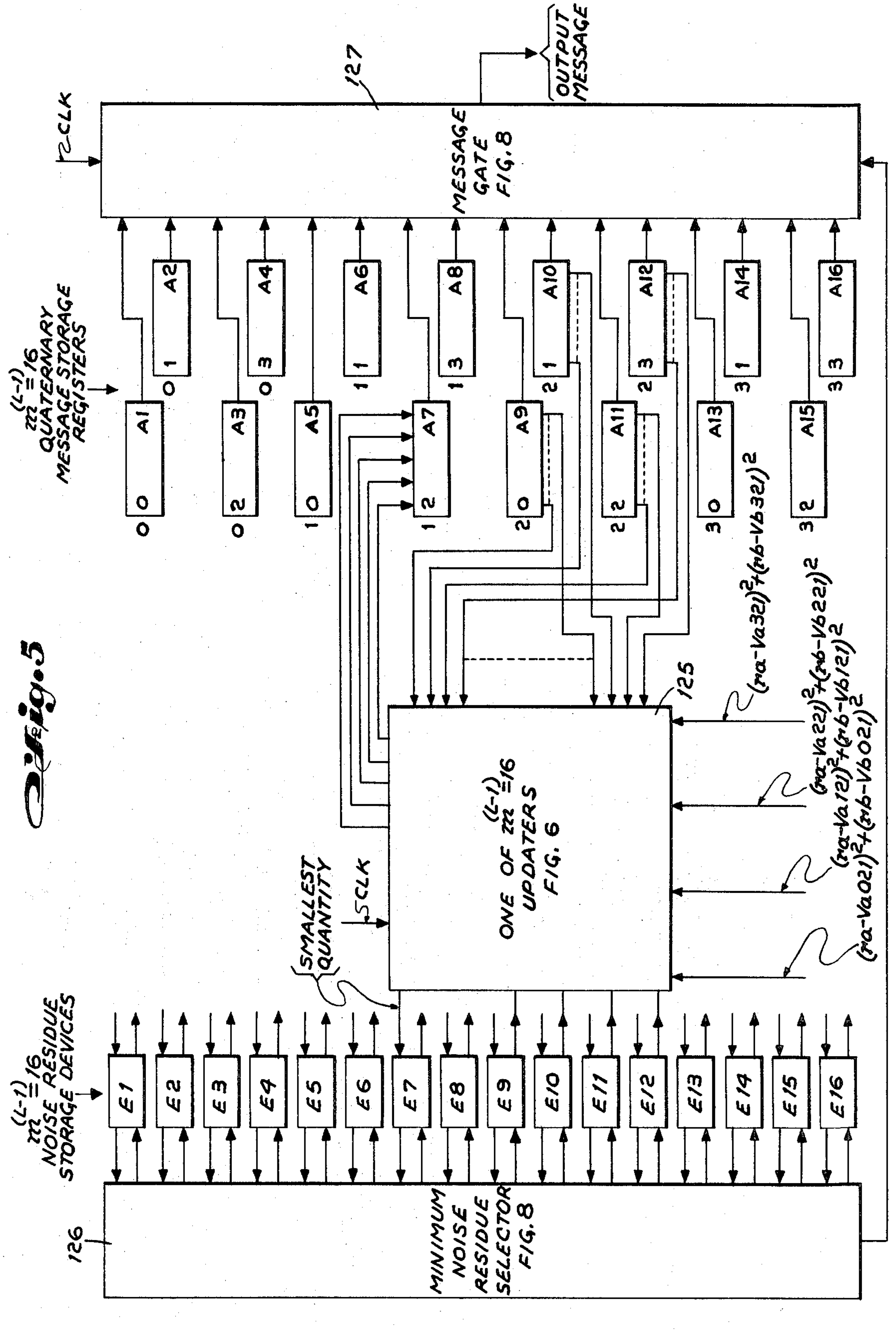
FIG. 5 is a block diagram of the maximum-likelihood processer of FIG. 1 in accordance with the principles of the present invention.

Referring to FIGS. 5 and 6, there is disclosed therein in block diagram form the maximum-likelihood processer 104 of FIG. 1. Processor 104 includes $m^{(L-1)}$ (16 in the example employed herein) quaternary message storage registers A, $m^{(L-1)}$ noise residue storage devices E, $m^{(L-1)}$ updaters 125 (only one of which is illustrated in FIGS. 5 and 6), minimum noise residue selector 126 and message gate 127, under control of selector 126, to provide the maximum-likelihood output message for the detection system in accordance with the principles of the present invention.

Registers A may be a parallel arrangement of binary shift registers wherein the states of the corresponding stages of the parallel binary shift registers represent the quaternary symbol in accordance with TABLE III.

TABLE III

| Quaternary Symbol | Binary States |
|---|---|
| 0 | 00 |
| 1 | 01 |
| 2 | 10 |
| 3 | 11 |

Storage devices E may be a capacitor arrangement which will store the noise residue as a voltage.

The $m^{(L-1)}$ likeliest messages are stored in registers A1–A16 as quaternary digits, and the corresponding value of noise residue is stored in storage devices E1–E16 as an analog voltage.

Minimum noise residue selector 126 determines which of the storage devices E has the smallest voltage and cause the message gate 127 to pass the earliest digit out of the corresponding register A as the output message of the detection system of the present invention. Selector 126 can also decrement storage device E by amounts no larger than the minimum $E$ to keep the voltage stored therein from increasing indefinitely. The last digit in each message storage register A is fixed as illustrated. This corresponds to the next to the latest message digit. The latest message digit is not stored in the register, but is known from the position of register A and has been written to the left of registers A in FIG. 5.

There are $m^{(L-1)}$ updaters 125 in the system, only one of which is shown in FIGS. 5 and 6. The updater illustrated is the one to determine the likeliest sequence to update the sequence ending in 21, hence, update the contents of register A7 and update the contents of noise residue storage device E7. The candidates for updating the message sequence in register A7 are those presently ending in 2, and hence, stored in registers A9, A10, A11 and A12, respectively. The winning candidate is determined by minimum noise selector 128 (FIG. 6). The minimum noise selector 128 receives outputs from summers 129, 130, 131 and 132. One input to summers 129–132 is provided by the output of storage devices E9–E12, respectively, while the other input is received from the associated one of summers 110 (FIG. 1) as the noise residue signal due to the contribution of the two folds of diversity. Selector 128 determines which of the storage devices E has the smallest voltage. Selector 128 will couple the determined smallest quantity to storage device E7 and will also control switches 133 to provide the update bits from the winning candidate for application to register A7. Suppose register A9 is the winning candidate. Then the second to last digits or bits in register A9 (five update bits in all as illustrated) are switched into the first through next to last position in register A7 by means of switches 133. The corresponding noise residue is that originally in storage device E9 plus that contributed by the present baud or bit interval. The increment, for the present baud interval, has a contribution from each diversity receiver which is the square of the difference between the received signal $r$ and the signal $V$ for each receiver. Note that there are $nm^L$ signals, where $n$ is the order of diversity. The $V$ for each detector is constant as long as the medium impulse response remains constant, and its contribution is governed by its circuit position. For example, $V_{a021}$ is the calculated contribution in diversity receiver $a$ from the present symbol 1, the previous symbol 2 and the next previous symbol 0, and are read off from the numbers associated with registers A9 and A7 in FIG. 1, the middle digit always being duplicated. Both $r$ and $v$ are vector quantities of dimensions $\log_2 m$. The minimum noise selector 128 determines the smallest of the summed (previous plus incremental) noise values and passes it onto storage device E7, and provides the proper switching signal to switches 133. In the design of the updaters 125, it is necessary to avoid race conditions, that is, no updater should alter the contents of registers A or storage device E until all updaters have extracted the required date from the store. The signal CLK into switches 133 control the time at the bit clock rate of switching the bits from the candidate registers to the register to be updated.

TABLE IV presented hereinbelow illustrates the manner in which the 16 updaters 125 are associated with registers A, storage devices E and the outputs of summers 110 (FIG. 1).

TABLE IV

| Register to be Updated | Registers Providing/Summers Inputs Updating | | | Storage Device Receiving Smallest Quantity |
|---|---|---|---|---|
| A1 | A1 | $(ra-Va000)^2+(rb-Vb000)^2$ | E1 | E1 |
| | A2 | $(ra-Va100)^2+(rb-vb100)^2$ | E2 | |
| | A3 | $(ra-Va200)^2+(rb-Vb200)^2$ | E3 | |
| | A4 | $(ra-Va300)^2+(rb-Vb300)^2$ | E4 | |
| A2 | A5 | $(ra-Va010)^2+(rb-Vb010)^2$ | E5 | E2 |
| | A6 | $(ra-Va110)^2+(rb-Vb110)^2$ | E6 | |
| | A7 | $(ra-Va210)^2+(rb-Vb210)^2$ | E7 | |
| | A8 | $(ra-Va310)^2+(rb-Vb310)^2$ | E8 | |
| A3 | A9 | $(ra-Va020)^2+(rb-Vb020)^2$ | E9 | E3 |
| | A10 | $(ra-Va120)^2+(rb-Vb120)^2$ | E10 | |
| | A11 | $(ra-Va220)^2+(rb-Vb220)^2$ | E11 | |
| | A12 | $(ra-Va320)^2+(rb-Vb320)^2$ | E12 | |
| A4 | A13 | $(ra-Va030)^2+(rb-Vb030)^2$ | E13 | E4 |
| | A14 | $(ra-Va130)^2+(rb-Vb130)^2$ | E14 | |
| | A15 | $(ra-Va230)^2+(rb-Vb230)^2$ | E15 | |
| | A16 | $(ra-Va330)^2+(rb-Vb330)^2$ | E16 | |
| A5 | A1 | $(ra-Va001)^2+(rb-Vb001)^2$ | E1 | E5 |
| | A2 | $(ra-Va101)^2+(rb-Vb101)^2$ | E2 | |
| | A3 | $(ra-Va201)^2+(rb-Vb201)^2$ | E3 | |
| | A4 | $(ra-Va301)^2+(rb-Vb301)^2$ | E4 | |
| A6 | A5 | $(ra-Va011)^2+(rb-Vb011)^2$ | E5 | E6 |
| | A6 | $(ra-Va111)^2+(rb-Vb111)^2$ | E6 | |

| | | | | |
|---|---|---|---|---|
| | A7 | $(ra-Va211)^2+(rb-Vb211)^2$ | E7 | |
| | A8 | $(ra-Va311)^2+(rb-Vb311)^2$ | E8 | |
| A7 | A9 | $(ra-Va021)^2+(rb-Vb021)^2$ | E9 | E7 |
| | A10 | $(ra-Va121)^2+(rb-Vb121)^2$ | E10 | |
| | A11 | $(ra-Va221)^2+(rb-Vb221)^2$ | E11 | |
| | A12 | $(ra-Va321)^2+(rb-Vb321)^2$ | E12 | |
| A8 | A13 | $(ra-Va031)^2+(rb-Vb031)^2$ | E13 | E8 |
| | A14 | $(ra-Va131)^2+(rb-Vb131)^2$ | E14 | |
| | A15 | $(ra-Va231)^2+(rb-Vb231)^2$ | E15 | |
| | A16 | $(ra-Va331)^2+(rb-Vb331)^2$ | E16 | |
| A9 | A1 | $(ra-Va002)^2+(rb-Vb002)^2$ | E1 | E9 |
| | A2 | $(ra-Va102)^2+(rb-Vb102)^2$ | E2 | |
| | A3 | $(ra-Va202)^2+(rb-Vb202)^2$ | E3 | |
| | A4 | $(ra-Va302)^2+(rb-Vb302)^2$ | E4 | |
| A10 | A5 | $(ra-Va012)^2+(rb-Vb012)^2$ | E5 | E10 |
| | A6 | $(ra-Va112)^2+(rb-Vb112)^2$ | E6 | |
| | A7 | $(ra-Va212)^2+(rb-Vb212)^2$ | E7 | |
| | A8 | $(ra-Va312)^2+(rb-Vb312)^2$ | E8 | |
| A11 | A9 | $(ra-Va022)^2+(rb-Vb022)^2$ | E9 | E11 |
| | A10 | $(ra-Va122)^2+(rb-Vb122)^2$ | E10 | |
| | A11 | $(ra-Va222)^2+(rb-Vb222)^2$ | E11 | |
| | A12 | $(ra-Va322)^2+(rb-Vb322)^2$ | E12 | |
| A12 | A13 | $(ra-Va032)^2+(rb-Vb032)^2$ | E13 | E12 |
| | A14 | $(ra-Va132)^2+(rb-Vb132)^2$ | E14 | |
| | A15 | $(ra-Va232)^2+(rb-Vb232)^2$ | E15 | |
| | A16 | $(ra-Va332)^2+(rb-Vb332)^2$ | E16 | |
| A13 | A1 | $(ra-Va003)^2+(rb-Vb003)^2$ | E1 | E13 |
| | A2 | $(ra-Va103)^2+(rb-Vb103)^2$ | E2 | |
| | A3 | $(ra-Va203)^2+(rb-Vb203)^2$ | E3 | |
| | A4 | $(ra-Va303)^3+(rb-Vb303)^2$ | E4 | |
| A14 | A5 | $(ra-Va013)^2+(rb-Vb013)^2$ | E5 | E14 |
| | A6 | $(ra-Va113)^2+(rb-Vb113)^2$ | E6 | |
| | A7 | $(ra-Va213)^2+(rb-Vb213)^2$ | E7 | |
| | A8 | $(ra-Va313)^2+(rb-Vb313)^2$ | E8 | |
| A15 | A9 | $(ra-Va023)^2+(rb-Vb023)^2$ | E9 | E15 |
| | A10 | $(ra-Va123)^2+(rb-Vb123)^2$ | E10 | |
| | A11 | $(ra-Va223)^2+(rb-Vb223)^2$ | E11 | |
| | A12 | $(ra-Va323)^2+(rb-Vb323)^2$ | E12 | |
| A16 | A13 | $(ra-Va033)^2+(rb-Vb033)^2$ | E13 | E16 |
| | A14 | $(ra-Va133)^2+(rb-Vb133)^2$ | E14 | |
| | A15 | $(ra-Va233)^2+(rb-Vb233)^2$ | E15 | |
| | A16 | $(ra-Va333)^2+(rb-Vb333)^2$ | E16 | |

Figure 7:
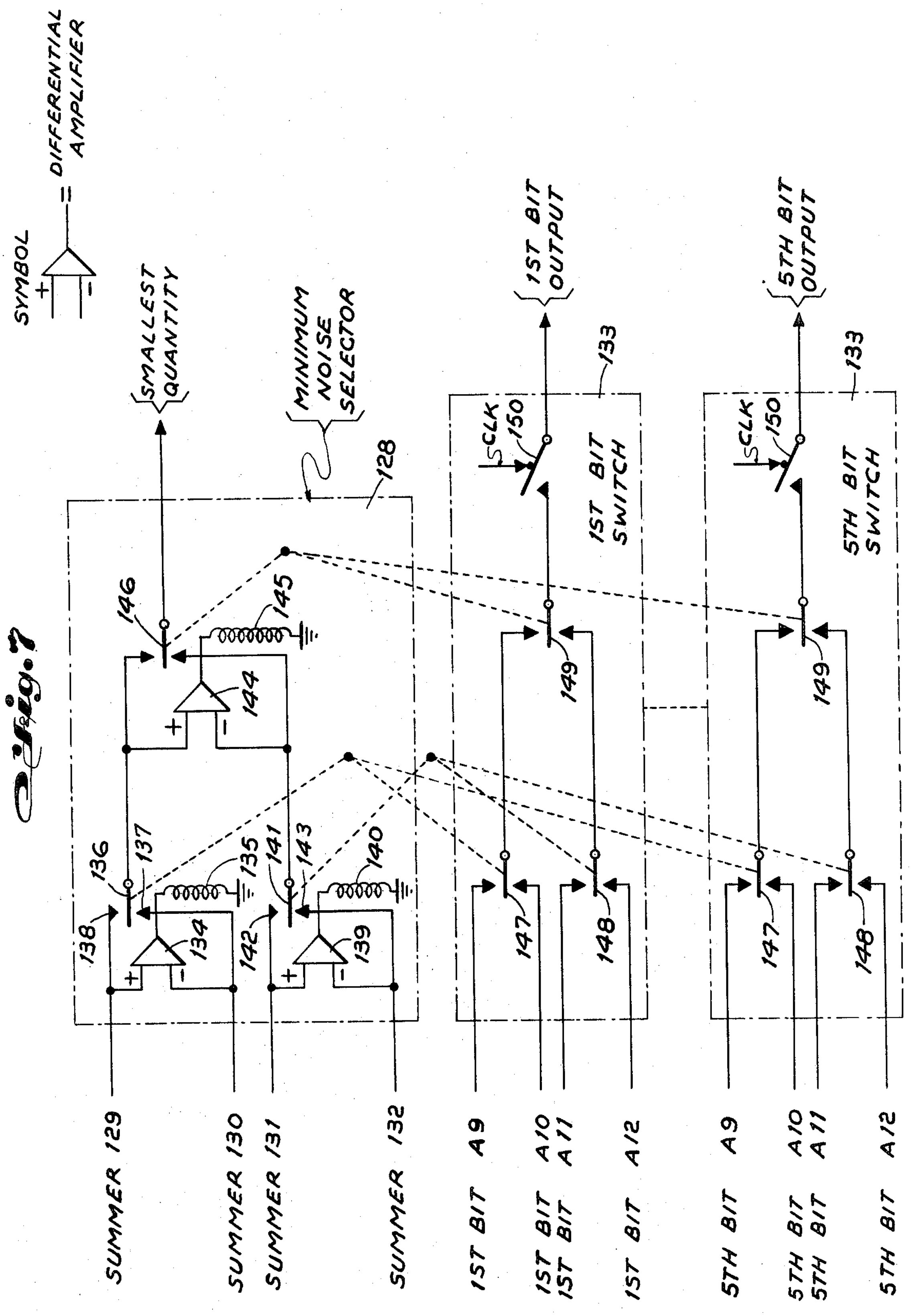
FIG. 7 is a schematic diagram of one embodiment of the minimum noise selector and bit switches of FIG. 6.

Referring to FIG. 7, there is illustrated therein an electro-mechanical arrangement for implementing selector 128 and switches 133. It should be noted that preferably an all electronic arrangement which is the equivalent of the electro-mechanical arrangement illustrated would be used.

Selector 128 includes an input from summers 129 and 130 which are coupled to a differential amplifier 134 to determine which of the inputs from summers 129 and 130 has the minimum value. When the input from summer 129 is greater than the input from summer 130 relay 135 is energized to pull the moving contact 136 down against contact 137. If the reverse condition is present, that is, the value of the input from summer 130 is greater than the value from the input of summer 129, differential amplifier 135 would detect this condition and energize relay 135 so as to move moving contact 136 against contact 138. Similarly, differential amplifier 139 and relay 140 control moving contact 141 to appropriately connect moving contact 141 to the appropriate one of the contacts 142 or 143 to pass the input thereto having the minimum value. The signals present on moving contacts 136 and 141 are passed to differential amplifier 144 which in cooperation with relay 145 and moving contact 146 select the smallest quantity or minimum value signal which then is coupled to the associated storage device E. Moving contacts 147, 148 and 149 are mechanically coupled to moving contacts 136, 141 and 146 as illustrated and assume the same relative position as these latter contacts so as to select the first bit output for updating the associated one of registers A. In a similar way the moving contacts of the other switches 133 are mechanically coupled to contacts 136, 141 and 146 as illustrated so as to couple the appropriate bit from the winning candidate updating shift register to the shift register to be updated. Switch contacts 150 in switches 133 are controlled by the signals CLK to assure the transfer of the associated bit to the register being updated at the proper time.

Figure 8:
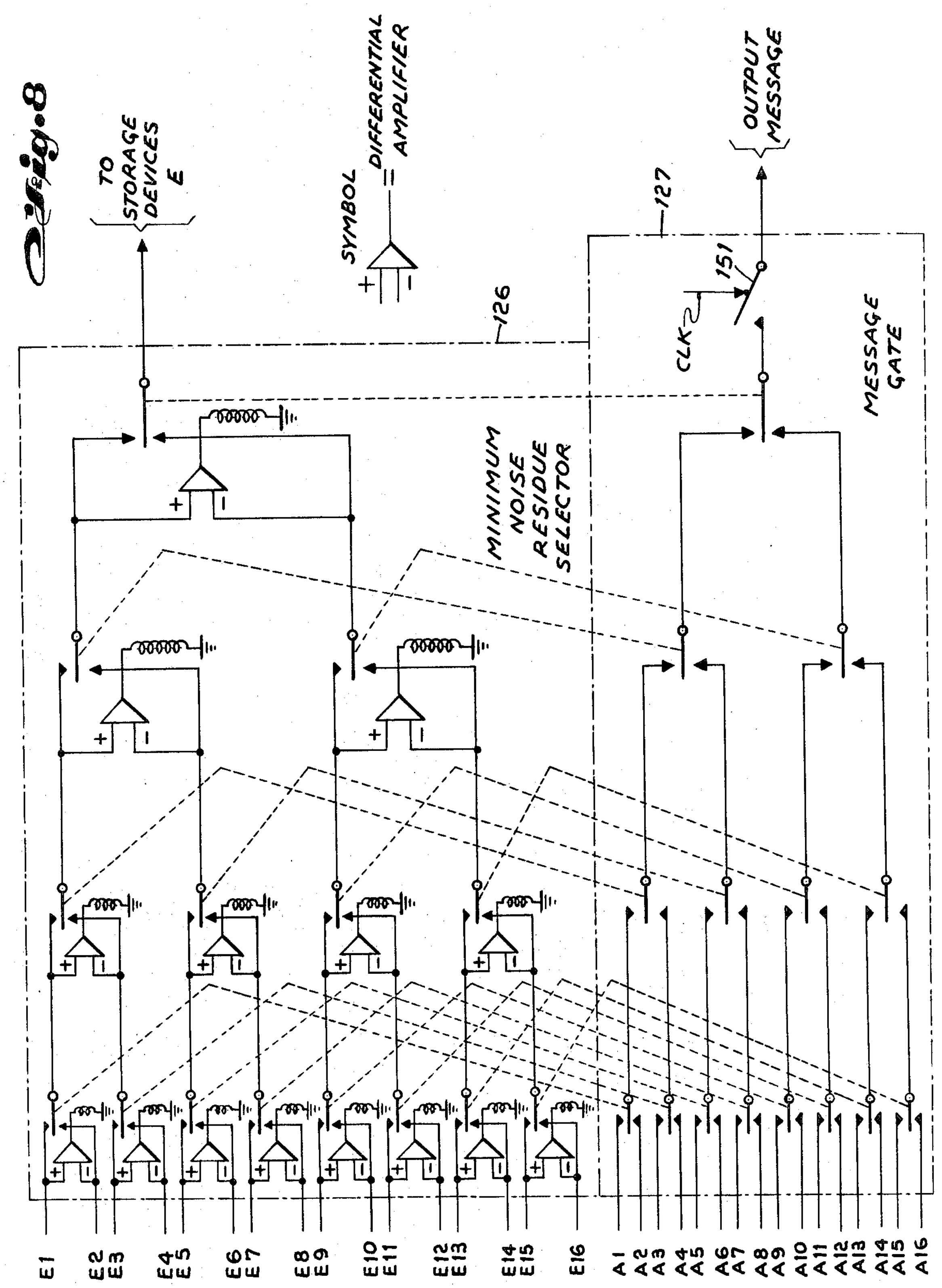
FIG. 8 is a schematic diagram of one embodiment of the minimum noise residue selector and message gate of FIG. 5.

Referring to FIG. 8, there is illustrated therein an electro-mechanical arrangement of the minimum noise residue selector 126 and the message gate 127 which operates substantially as described with respect to FIG. 7 except that there are four tiers of differential amplifiers and relays and moving contacts associated with the relays to determine which of the sixteen storage devices E has the noise residue with a minimum value. Through means of mechanical linkages between the moving contacts of selector 126 and the moving contacts of message gate 127, the output message sequence for the detection system of the present invention is selected under control of selector 126. Switch contact 151 controlled by the signal CLK insures that the output message is transferred to the output of the detection system at the appropriate time.

As mentioned hereinabove with respect to FIG. 7 an electronic equivalent to that illustrated in FIG. 8 would be used in a practical implementation of selector 126 and message gate 127.

It should be noted that registers A were previously mentioned to be quaternary shift registers one implementation of which are parallel disposed binary shift registers. With this implementation of shift registers A, it would be necessary to have parallel switches 133 for each bit transferred to the register being updated so that the binary bits for the parallel disposed shift registers containing the candidate message sequences for updating are appropriately coupled to the parallel binary shift registers of the shift register being updated.

While I have described above the principles of my invention in connection with specific apparatus it is to be clearly understood that this description is made only by way of example and not as a limitation to the scope of my invention as set forth in the objects thereof and in the accompanying claims.

I claim:

1. A maximum-likelihood diversity detection system for a digital signal propagated through a dispersive medium comprising:

$m^{(L-1)}$ first means, each of said first means storing a different one of $m^{(L-1)}$ digital message sequences capable of being received from said medium, where $m$ is an integer greater than one equal to the number of symbols transmitted and L is an integer greater than one equal to the number of bit intervals over which there will be significant receiver response due to a single transmitted one of said $m$ symbols;

$n$ receivers for said digital signal, where $n$ is an integer greater than one equal to the number of signal paths for said digital signal that has traveled through said dispersive medium;

second means coupled to said $n$ receivers to generate from said digital signal $nm^L$ noise residues;

$m^{(L-1)}$ third means coupled to said second means, each of said third means detecting in a different one of $m^{(L-1)}$ groups of $m$ noise residues that noise residue having a first minimum value;

$m^{(L-1)}$ fourth means each coupled to a different one of said $m^{(L-1)}$ third means to store the associated one of said noise residue having said first minimum value; and fifth means coupled to said $m^{(L-1)}$ first means and said $m^{(L-1)}$ fourth means to detect from said stored noise residues that noise residue having a second minimum value and to provide one of said $m^{(L-1)}$ digital message sequences as an output digital message sequence for said detection system, said output message sequence being determined by said noise residue having said second minimum value.

2. A detection system according to claim 1, wherein $m$ is equal to four as provided by a quaternary phase shift keyed modulation system;
$n$ is equal to 2;
$L$ is equal to 3;
$m^{(L-1)}$ is equal to 16; and
$nm^L$ is equal to 128.

3. A detection system according to claim 1, wherein said fifth means includes a minimum value selector coupled to all of said $m^{(L-1)}$ fourth means to detect said noise residue having said second minimum value, and a switching arrangement coupled to all of said $m^{(L-1)}$ first means and said minimum value selector controlled by said noise residue having said second minimum value to provide said output message sequence.

4. A detection system according to claim 1, further including $m^{(L-1)}$ sixth means each coupled to a different one of said $m^{(L-1)}$ first means, $m$ predetermined ones of said first means and a different one one of said $m^{(L-1)}$ third means to update said message sequence stored in the associated one of said $m^{(L-1)}$ first means by a predetermined number of bits of said message sequence in that one of said $m$ predetermined ones of said means corresponding to said noise residue having said first minimum value in the associated one of said $m^{(L-1)}$ groups of $m$ noise residues.

5. A detection system according to claim 4, wherein each of said sixth means includes a first switching arrangement for each of said predetermined number of bits, each of said switching arrangements being coupled to each of said $m$ predetermined ones of said first means and controlled by said noise residue having said first minimum value detected by the associated one of said $m^{(L-1)}$ third means.

6. A detection system according to claim 5, wherein said fifth means includes a minimum value selector coupled to all of said $m^{(L-1)}$ fourth means to detect said noise residue having said second minimum value, and a second switching arrangement coupled to all of said $m^{(L-1)}$ first means and said minimum value selector controlled by said noise residue having said second minimum value to provide said output message sequence.

7. A detection system according to claim 6, wherein $m$ is equal to four as provided by a quaternary phase shift keyed modulation system;
$n$ is equal to 2;
$L$ is equal to 3;
$m^{(L-1)}$ is equal to 16; and
$nm^L$ is equal to 128.

8. A detection system according to claim 4, wherein said fifth means includes a minimum value selector coupled to all of said $m^{(L-1)}$ fourth means to detect said noise residue having said second minimum value, and a switching arrangement coupled to all of said $m^{(L-1)}$ first means and said minimum value selector controlled by said noise residue having said second minimum value to provide said output message sequence.

* * * * *